United States Patent
Egen et al.

(10) Patent No.: US 7,461,710 B2
(45) Date of Patent: Dec. 9, 2008

(54) ELECTRIC STEERING AND DRIVE SYSTEM FOR A VEHICLE WITH WHEEL SIDE STEERING SYSTEM

(75) Inventors: Thomas Egen, Weil (DE); Alexander Walter, Augsburg (DE); Max Witzenberger, Aindling (DE)

(73) Assignee: Renk Aktiengesellschaft, Augsburg (DE)

( * ) Notice: Subject to any disclaimer, the term of this patent is extended or adjusted under 35 U.S.C. 154(b) by 390 days.

(21) Appl. No.: 10/515,091

(22) PCT Filed: May 17, 2003

(86) PCT No.: PCT/EP03/05205

§ 371 (c)(1),
(2), (4) Date: Jul. 11, 2005

(87) PCT Pub. No.: WO03/097395

PCT Pub. Date: Nov. 27, 2003

(65) Prior Publication Data

US 2005/0284672 A1    Dec. 29, 2005

(30) Foreign Application Priority Data

May 21, 2002    (DE)    ............... 102 22 812

(51) Int. Cl.
*B62D 55/00*    (2006.01)
(52) U.S. Cl. .................... 180/9.1; 180/6.5; 180/65.5

(58) Field of Classification Search .................. 180/6.5, 180/65.5, 9.1
See application file for complete search history.

(56) References Cited

U.S. PATENT DOCUMENTS

| 1,997,974 | A | | 4/1935 | Moore et al. |
| 5,650,713 | A | * | 7/1997 | Takeuchi et al. ............... 322/16 |
| 5,713,426 | A | * | 2/1998 | Okamura .................... 180/65.3 |
| 5,903,113 | A | * | 5/1999 | Yamada et al. ................ 318/10 |
| 5,939,848 | A | * | 8/1999 | Yano et al. ................... 318/139 |
| 6,216,808 | B1 | * | 4/2001 | Kuno et al. ................. 180/65.3 |
| 6,295,487 | B1 | * | 9/2001 | Ono et al. ...................... 701/22 |
| 6,830,117 | B2 | * | 12/2004 | Chernoff et al. ........... 180/65.1 |
| 2001/0020554 | A1 | * | 9/2001 | Yanase et al. .............. 180/65.3 |

FOREIGN PATENT DOCUMENTS

DE    3728171 A1    3/1989
DE    19850606 A1    5/2000

* cited by examiner

*Primary Examiner*—Joanne Silbermann
*Assistant Examiner*—Michael R Stabley
(74) *Attorney, Agent, or Firm*—Leydig, Voit & Mayer, Ltd.

(57) ABSTRACT

The invention relates to an electrical steering and drive system for a vehicle with wheel-based steering with at least two electrically driven axles, a mechanical coupling between the drive sides being provided on at least one driven axle in order to transmit power from one drive side to the other, and a purely electrical transmission of drive power being provided on the other driven axles.

19 Claims, 6 Drawing Sheets

ELECTRIC STEERING AND DRIVE SYSTEM FOR A VEHICLE WITH WHEEL SIDE STEERING SYSTEM

CROSS-REFERENCE TO RELATED PATENT APPLICATIONS

This application is related to PCT/US03/0525 filed May 17, 2003, which claims priority to German Patent Application No. 102 22 812.4 filed on May 21, 2002, both of which applications, and their listed references, are herby incorporated by reference in their entireties.

FIELD OF THE INVENTION

The invention relates generally to electrical steering and drive systems and more particularly to an electrical steering and drive system for a vehicle with wheel-based system.

BACKGROUND OF THE INVENTION

Wheeled vehicles are usually steered by rotating wheels about their vertical axis (double-pivot or Ackermann steering). In order to avoid the associated additional expenditure with respect to steering gears and bearings for the steered wheels having free axles and in order to permit a significantly greater degree of mobility as a result of a smaller steering radius, a technique referred to as "wheel-based steering" is sometimes used in wheeled vehicles. For example, this technique is often used in the construction industry or in military wheeled vehicles. In wheel-based steering, the vehicle's wheels on the inside of the bend must be braked during cornering. In the construction context, such vehicles are usually used only for slow velocities since at relatively high velocities higher braking power is necessary for steering.

Efficient drive systems for high speed vehicles with wheel-based steering often conserve the braking power produced by the wheels on the inside of the steering curve and transfer that power to the wheels on the outside of the steering curve. The term regenerative steering is often used to describe this type of technology.

However, when using this technique on vehicles with separate electrical drives for each drive side or for each drive (crawler) wheel, the performance of the electric motors must be configured not only to accommodate the power of the prime power generator (for example diesel engine) but also based to accommodate the regenerative power. This requirement leads to significantly over designed electric motors and complex cable systems to handle the correspondingly large electrical currents.

DE 198 50 606 discloses such an arrangement for use in crawler vehicles. An internal combustion engine driving a generator generates electrical power for driving the vehicle via electric drive motors. Regenerative steering (i.e., electrical power transmission from drive motors on the inside of the bend to drive motors on the outside of the bend) is also disclosed. U.S. Pat. No. 1,997,974 discloses a wheeled vehicle with a wheel hub motor. In this reference, the motors are relocated to the empty space in the interior of the wheels, which is otherwise unused, so that there is more space available in the interior of the vehicle.

DE 37 28 171 describes an electromechanical drive system for full track vehicles. In the simplest case, this drive system is composed of an electric drive motor which drives both sides of the vehicle in the same direction by means of a central shaft, and an electric steering motor which drives a zero shaft whose rotation speed has a positive effect on one side and a negative effect on the other. Steering differentials on the left and right add the rotational speeds of the two motors and pass on the sum to the crawler wheels. This solution provides the advantage that the electromechanical steering can transmit a multiple of the rated power of the steering motor as what is referred to as "regenerative power" from the drive side on the inside of the bend to the drive side on the outside of the bend. As a result of this electromechanical transfer of power, the regenerative component flows via the mechanical gear mechanism arrangement and not via the electric motors so that they can be configured in accordance with the primary power of the vehicle. However, a disadvantage in comparison to drives with wheel hub motors is that increased installation space is required in the interior of the vehicle, and which wastes space and vehicle capacity.

OBJECTS AND SUMMARY OF THE INVENTION

An object of the invention is to provide an efficient and compact electrical drive for a vehicle which permits regenerative steering. This object is achieved in an embodiment of the invention by an electrical steering and drive system for a vehicle with wheel-based steering with at least two electrically driven axles, a mechanical coupling between the drive sides being provided on at least one driven axle in order to transmit power from one drive side to the other, and a purely electrical transmission of drive power being provided on the other driven axles.

The advantageous combination of purely electrically functioning wheel hub drives with an electromechanical drive system, which uses the principle of a "zero shaft", permits the advantages of both systems to be used in one vehicle with wheel-based steering, while avoiding the disadvantages of these systems.

The advantageous combination of wheel hub motors on one axle with the principle of the zero shaft of an electromechanical drive on another axle permits wheel hub motors to be configured taking into account only the drive power which is actually installed at the vehicle. The excessive over-dimensioning of wheel hub motors is not required so that more lightweight vehicles are possible. The invention further permits a highly integrated electrical drive with a high degree of mobility, which utilizes the existing volume of the vehicle in an optimum way with minimum weight.

Further features and advantages will be apparent from the claims read in conjunction with the following description.

BRIEF DESCRIPTION OF THE DRAWINGS

The features of the present invention are explained below in more detail with reference to preferred embodiments. In the associated schematic drawings.

While the invention is susceptible to various modifications and alternative arrangements and constructions, certain illustrated embodiments of the invention have been shown in the drawings and will be described below in detail. It should be understood, however, that there is no intention to limit the invention to the specific forms disclosed, but rather the intention is to encompass all modifications, alternative constructions and equivalents falling within the spirit and scope of the attached claims.

DETAILED DESCRIPTION OF PREFERRED EMBODIMENTS

Figure 1A:
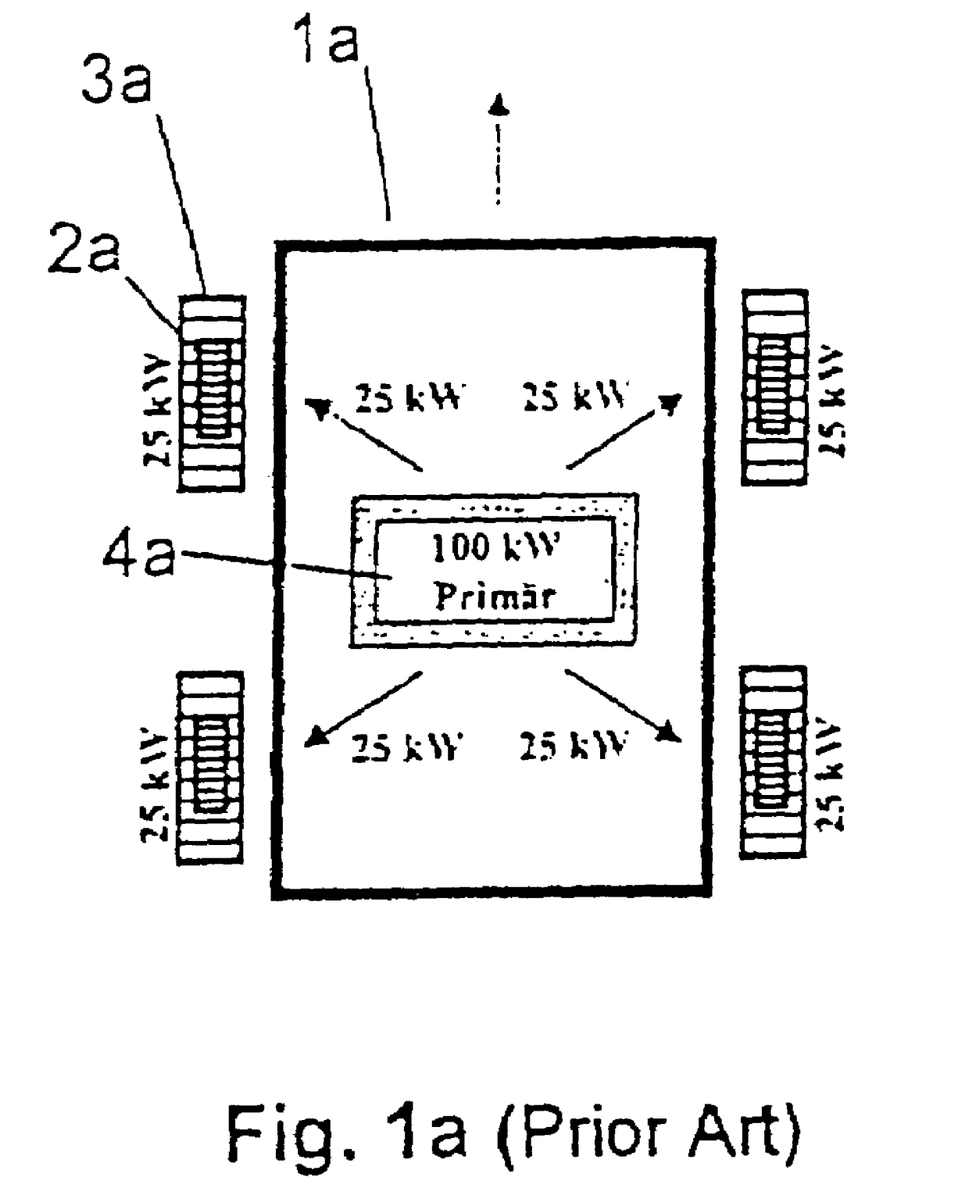
FIG. 1 shows a wheeled vehicle with wheel hub motors according to the prior art.

Referring now to FIG. 1a, there is shown a vehicle 1a with four wheels 3a which are each driven by means of wheel hub motors 2a according to the prior art. In order to generate electrical power, an internal combustion engine is provided which drives a current generator as a power source 4a. The vehicle 1a is configured primarily for straight-ahead travel, and for the purpose of steering, the wheels 3a on the inside of the bend are only braked; that is to say, the kinetic energy which is present is converted into heat during braking. Since no regenerative steering is provided—that is to say the transfer of power from the vehicle side on the inside of the bend to the vehicle side on the outside of the bend—the wheel hub motors 2a can be configured solely on the basis of the electrical power from the power source 4a. In the illustrated example, it is assumed that there is 100 kilowatts of power from the power source 4a and that this power is distributed uniformly over all four wheel hub motors 2a. A maximum power consumption of 25 kilowatts will be assumed for each wheel hub motor 2a, and the motors can be given correspondingly small dimensions.

Figure 1B:
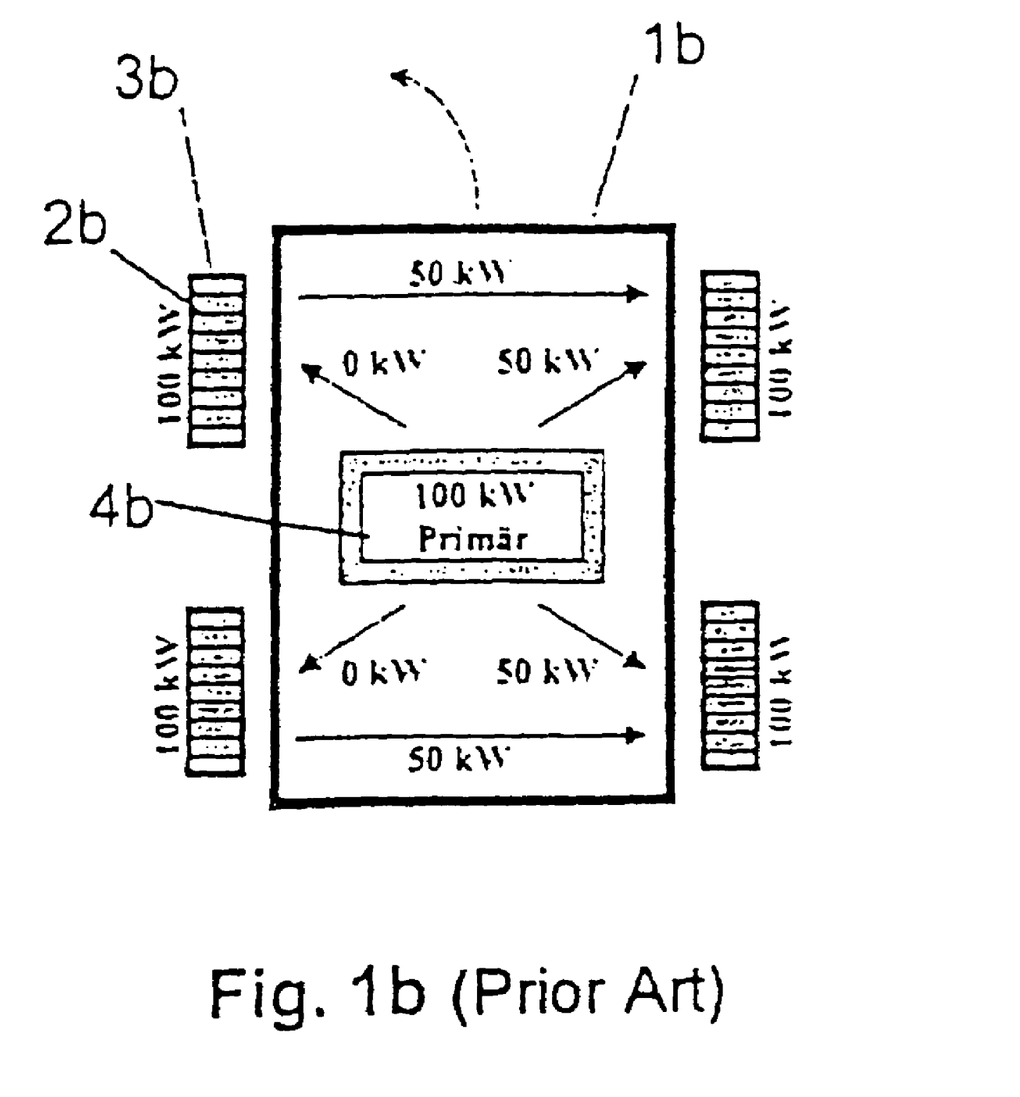

FIG. 1b illustrates the configuration of the same vehicle when traveling along a left-hand bend—taking into account regenerative steering—according to the prior art. The following energy or power balance is obtained on the basis of 100 kilowatts of power from the power source 4b and devices for transmitting the electrical power from the wheel hub motors 2b on the inside of the bend, which operate as generators in this driving state, to the wheel hub motors 2b on the outside of the bend. The entire available electrical power from the power source 4b is output by correspondingly controlling power electronics on the wheel hub motors 2b on the outside of the bend, specifically 50 kilowatts to the front wheel 3b and 50 kilowatts to the rear wheel 3b. Furthermore, in the generator mode, the braking power at the wheel hub motors 2b on the inside of the bend are converted into electrical drive power which is also fed to the wheel hub motors 2b on the outside of the bend. This again respectively results in 50 kilowatt power for the front and rear wheel hub motors 2b on the outside of the bend. In order to be able to cope with these extreme driving states, the wheel hub motor 2b must be configured for 100 kilowatts maximum power consumption. This necessary over dimensioning of the drive motors 2b increases the mass of the vehicle and requires corresponding installation space so that owing to the wheel diameters, which can be increased only to a limited degree, the drive power of the vehicle is limited or corresponding motors have to be provided outside the wheel hub. If appropriate, installation space then has to be provided in the interior of the vehicle for said motors.

Figure 2:
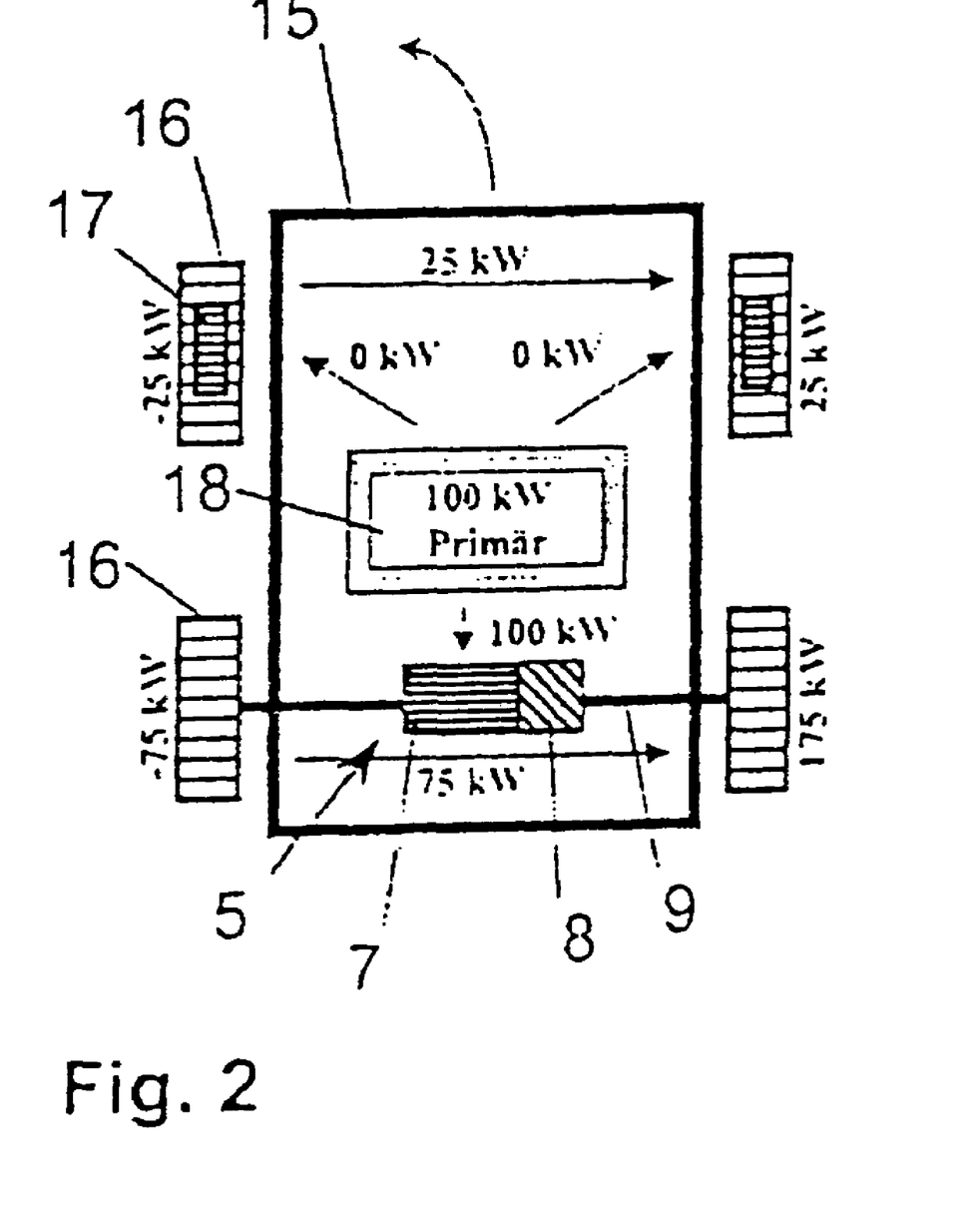
FIG. 2 shows a wheeled vehicle according to the invention in accordance with a first embodiment.
Figure 5:
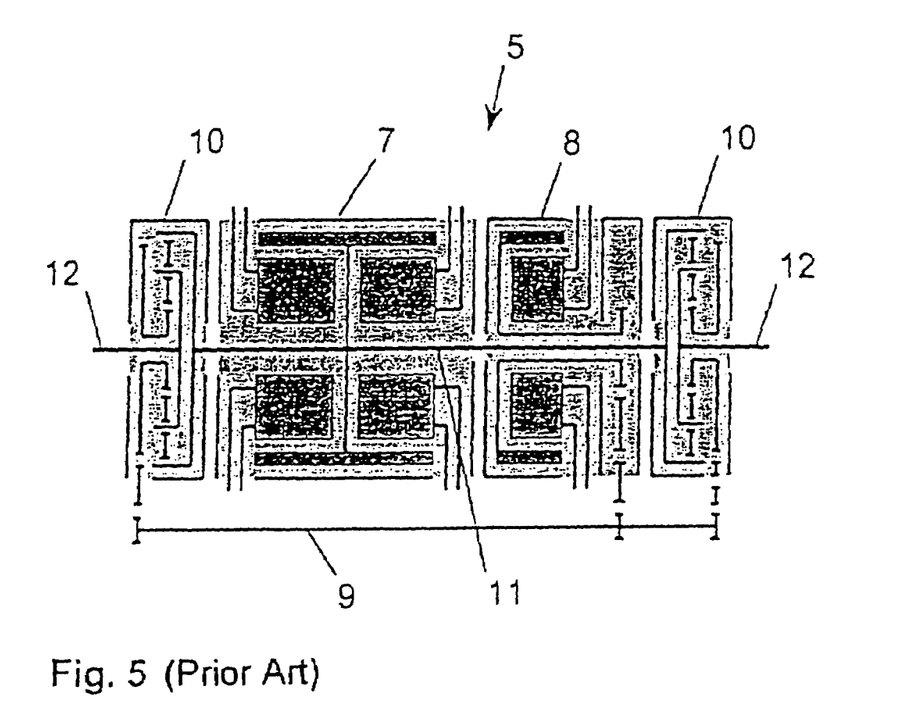
FIG. 5 illustrates an electromechanical drive according to the prior art.

A first embodiment according to the invention is illustrated in FIG. 2, with respect to a wheeled vehicle 15. Assuming a power source 18 with an electrical power of 100 kilowatts, wheel hub motors 17 are preferably provided on the wheels 16 of the front axle, and an electromechanical drive 5 on the rear axle. For straight-ahead travel, 50 kilowatts drive power is output to both driven axles by the power source 18. The electromechanical drive 5 is composed of an electric drive motor 7 which drives the two drive sides uniformly, and a steering motor 8 for transmitting regenerative power. The basic function of the electromechanical drive 5 is apparent from the schematic FIG. 5. The drive motor 7 drives, via a central shaft 11, a left-hand and a right-hand steering differential gear mechanism 10, which drive wheels or crawler wheels via their output shafts 12. The steering differentials 10 are connected mechanically to one another via a zero shaft 9. The steering motor 8 can transmit a multiple of its own rated power as regenerative power from the side on the inside of the bend to the side on the outside of the bend by driving the zero shaft 9. Owing to this relatively high efficiency of the electromechanical transmission of power in comparison with the purely electrical transmission of power, the steering motor 8 can be given relatively small dimensions. The steering motor 8 may be arranged in the interior of the vehicle or outside the vehicle.

During cornering by the vehicle 15 illustrated in FIG. 2, a large part of the regenerative power is transmitted from the wheels on the inside of the bend to the vehicle side on the outside of the bend via the mechanical zero shaft 9, and only a small part is transmitted via the purely electrical coupling on the other axle. In the instance of cornering illustrated by way of example, the entire power of the power source 18 is fed to the electromechanical drive 5 so that the steering motor 8 transmits a regenerative power of 75 kilowatts to the side on the outside of the bend, which power is added to the power of the power source 18 to form an overall power of 175 kilowatts. Since the wheel hub motors 17 of the other axle do not receive any power from the power source 18 in the case of cornering, it is sufficient to transmit a regenerative power of 25 kilowatts to the vehicle side on the outside of the bend in a purely electrical fashion. Owing to this advantageous division of the transmission of power, the wheel hub motors 17 do not need to be over designed. The wheel hub motors 17 can therefore be configured for significantly lower maximum current drain or power consumption; therefore, in the present exemplary embodiment, it would be possible to provide, for example, 25 kilowatts per wheel hub motor 17.

In order to steer the vehicle 15 in an embodiment of the invention the wheel hub motors 17 of the purely electrical axle continue to operate in a uniform fashion without providing for the transmission of electrical power, and the regenerative steering power is transmitted solely via the electromechanical zero shaft 9. It is also possible to switch off the wheel hub motor 17 on the inside of the bend or to decrease power to it in order to tighten the bend radius which is to be traveled around.

This embodiment advantageously makes use of the installation space in the wheel hubs of one axle, and owing to the normal design of the motors a lower vehicle weight and a lower investment expenditure for the drive is obtained. In embodiments with electric motors in the interior of the vehicle, instead of the wheel hub motors, it is of course necessary to provide corresponding installation space in the vehicle.

Figure 3:
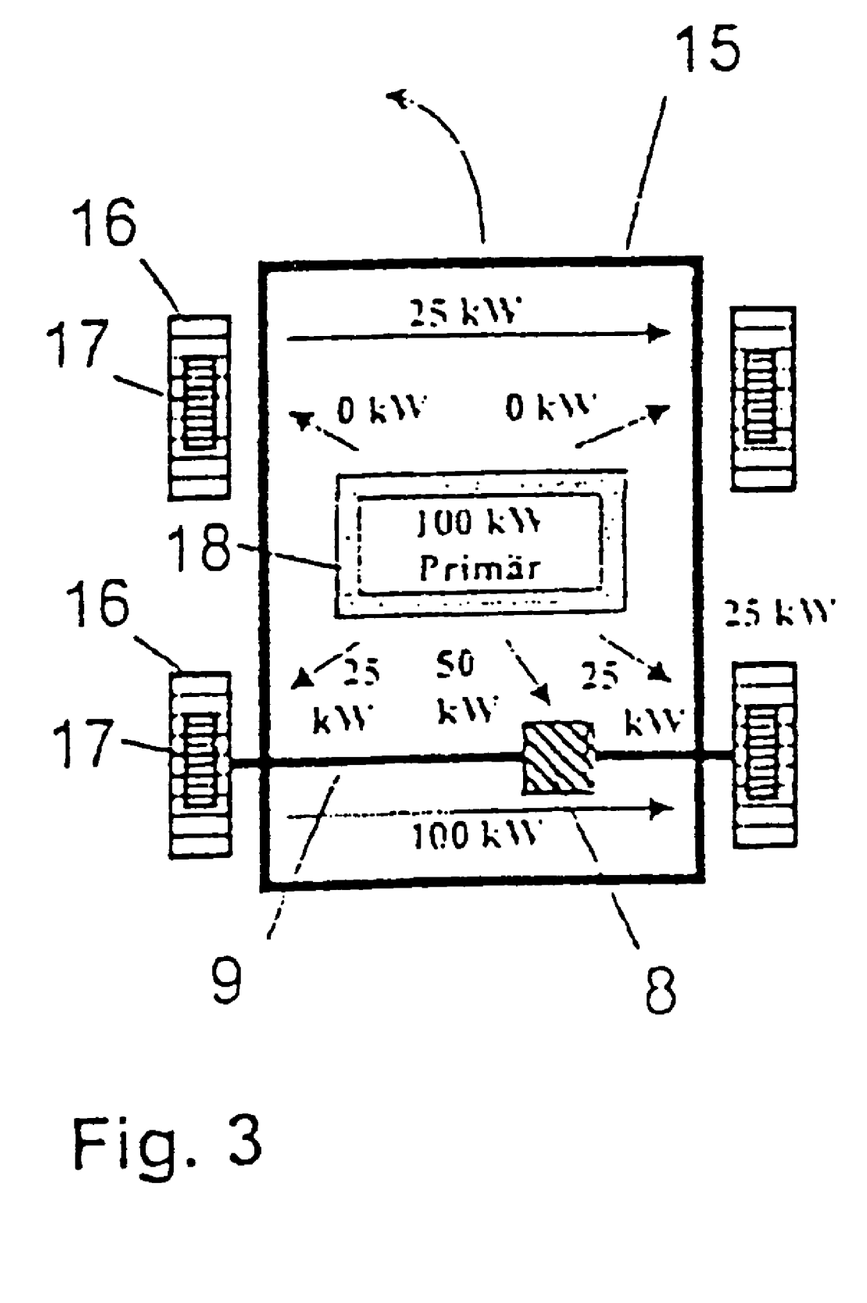
FIG. 3 shows a further embodiment of a wheeled vehicle according to an embodiment of the invention.

FIG. 3 illustrates a further embodiment in which the compact assembly of the electromechanical drive is broken up. Instead of a drive motor 7 in the interior of the vehicle 15, two wheel hub motors 17 are provided inside the wheels 16 of the mechanically coupled axle. These wheel hub motors 17 are preferably designed in precisely the same way as those on one or more other axles. In this example, 25 kilowatts maximum power consumption is provided. The steering differentials can also be integrated into the wheel hub or provided on the steering motor 8 (arranged in the vehicle 15). This advantageous drive arrangement makes further space available within the vehicle because only the zero shaft 9 and the steering motor 8 then have to be arranged in the interior.

Figure 4:
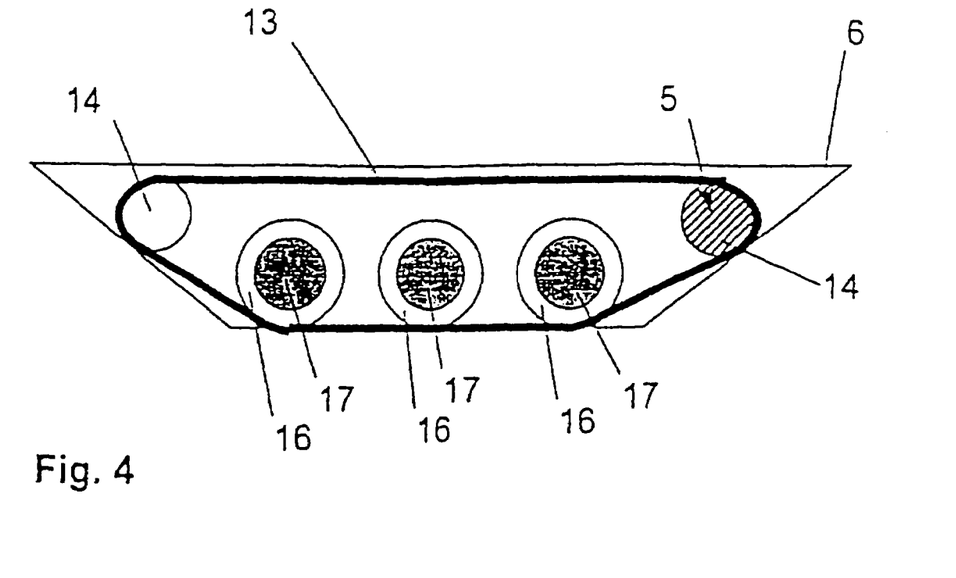
FIG. 4 shows a crawler vehicle with a drive arrangement according to an embodiment of the invention.

FIG. 4 illustrates a crawler vehicle 6 with a drive according to an embodiment of the invention. The crawler 13 is guided over two deflection rollers 14 and a plurality of crawler wheels 16, an electromechanical drive 5 being provided on a deflection roller 14, and wheel hub motors 17 being respectively provided inside the crawler wheel 16. The other drive side (not visible) is constructed in an analogous fashion. The wheel hub motors 17 can provide propulsion and the electromechanically driven axle can transmit the wattless component.

In all the exemplary embodiments described, preferably one or more internal combustion engines with electrical power generators are used as the power source 18. However, any other suitable power source may also be used. For example, batteries or other storage devices for electrical power are also usable within embodiments of the invention. Electrical lines for supplying power could also be used for vehicles which are restricted in the movement radius.

The vehicles 6, 15 which are described are each equipped with corresponding power electronic parts and controllers for the operationally reliable distribution of the power and control of the drives, according to the regulations for approval of roadworthiness, and ensure safe operation in traffic.

In addition to the two-axle wheeled vehicles which are illustrated and described and the crawler vehicle, embodiments with more that two axles are also possible within embodiments of the invention, with at least one axle with a mechanical coupling being provided in all variants in order to transmit the regenerative power from one drive side to the other.

In a four-axle vehicle it is possible to equip, for example, two axles with mechanically decoupled wheel hub drives and in each case two axles with electromechanical drives.

In vehicles with more than two axles it is also possible to couple a plurality of wheels to an electromechanical drive via gear mechanism elements which distribute the torque or compensate for the rotational speed.

An important aspect in embodiments of the invention is to transmit the regenerative steering power largely by means of a mechanical coupling since this is significantly more efficient than the purely electrical transfer of power. Through this division of functions, according to which the drive power is transmitted electrically and the regenerative steering power is transmitted mechanically, a saving in weight is obtained and a reduction in the spending on drive motors together with simpler cabling of the vehicle are obtained. A vehicle equipped according to embodiments of the invention has a highly integrated electrical drive which has a high degree of mobility and utilizes the volume of the vehicle in an optimum way with a minimum weight.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best level known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electrical steering and drive system for a vehicle with wheel-based steering having first and second drive sides, the system comprising:
    at least two electrically driven axles;
    a mechanical coupling between the drive sides being provided on at least one driven axle in order to transmit power from one drive side to the other; and
    an electrical transmission of drive power on the other driven axles.

2. The electrical steering and drive system according to claim 1, wherein the mechanical coupling comprises:
    at least one differential gear mechanism;
    a steering motor;
    and a shaft.

3. The electrical steering and drive system according to claim 1, wherein the electrical transmission of drive power is adapted to transmit steering power from one drive side to the other.

4. The electrical steering and drive system according to claim 1 wherein both an electric driving motor and an electric steering motor are provided on the mechanical coupling.

5. The electrical steering and drive system according to claim 2 wherein both an electric driving motor and an electric steering motor are provided on the mechanical coupling.

6. The electrical steering and drive system according to claim 3 wherein both an electric driving motor and an electric steering motor are provided on the mechanical coupling.

7. The electrical steering and drive system according to claim 1, wherein electric motors which are integrated into the wheel hub are provided on all the driven axles.

8. The electrical steering and drive system according to claim 2, wherein electric motors which are integrated into the wheel hub are provided on all the driven axles.

9. The electrical steering and drive system according to claim 3, wherein electric motors which are integrated into the wheel hub are provided on all the driven axles.

10. The electrical steering and drive system according to claim 4, wherein electric motors which are integrated into the wheel hub are provided on all the driven axles.

11. The electrical steering and drive system according to claim 5, wherein electric motors which are integrated into the wheel hub are provided on all the driven axles.

12. The electrical steering and drive system according to claim 6, wherein electric motors which are integrated into the wheel hub are provided on all the driven axles.

13. The electrical steering and drive system according to claim 1, wherein at least one element for distributing torque, to which a plurality of wheels of one side of the vehicle can be coupled, is provided on the mechanical coupling.

14. The electrical steering and drive system according to claim 1, wherein at least one element for compensating for rotational speed, to which a plurality of wheels of one side of the vehicle can be coupled, is provided on the mechanical coupling.

15. The electrical steering and drive system according to claim 2, wherein at least one element for distributing torque, to which a plurality of wheels of one side of the vehicle can be coupled, is provided on the mechanical coupling.

16. The electrical steering and drive system according to claim 2, wherein at least one element for compensating for rotational speed, to which a plurality of wheels of one side of the vehicle can be coupled, is provided on the mechanical coupling.

17. The electrical steering and drive system according to claim 3, wherein at least one element for distributing torque, to which a plurality of wheels of one side of the vehicle can be coupled, is provided on the mechanical coupling.

18. The electrical steering and drive system according to claim 3, wherein at least one element for compensating for rotational speed, to which a plurality of wheels of one side of the vehicle can be coupled, is provided on the mechanical coupling.

19. The electrical steering and drive system according to claim 1, wherein the vehicle is selected from the group consisting of a wheeled vehicle and a crawler vehicle.

* * * * *